United States Patent [19]

Kustom et al.

[11] 4,245,287
[45] Jan. 13, 1981

[54] METHOD OF CONTROLLING SWITCHING OF A MULTIPHASE INDUCTOR-CONVERTER BRIDGE

[75] Inventors: Robert L. Kustom, Palos Heights; Raymond E. Fuja, Justice, both of Ill.

[73] Assignee: The United States of America as represented by the United States Department of Energy, Washington, D.C.

[21] Appl. No.: 16,037

[22] Filed: Feb. 28, 1979

[51] Int. Cl.³ .............................................. H02J 15/00
[52] U.S. Cl. ......................................... 363/27; 363/14
[58] Field of Search ...................... 363/14, 27, 34–37

[56] References Cited
U.S. PATENT DOCUMENTS 4,079,305  3/1978  Peterson et al. ...................... 363/27
4,122,512  10/1978  Peterson et al. ...................... 363/14

Primary Examiner—William M. Shoop
Attorney, Agent, or Firm—James E. Denny; Frank H. Jackson; Donald P. Reynolds

[57] ABSTRACT

In an inductor-convertor circuit for transferring electrical energy between a storage coil and a load coil using a storage thyristor bridge, a load thyristor bridge, and a set of commutating capacitors, operation is improved by a method of changing the rate of delivery of energy in a given direction. The change in rate corresponds to a predetermined change in phase angle between the load bridge and the storage bridge and comprises changing the phase of the bridge by two steps, each equal to half the predetermined change and occurring 180° apart. The method assures commutation and minimizes imbalances that lead otherwise to overvoltages.

7 Claims, 11 Drawing Figures

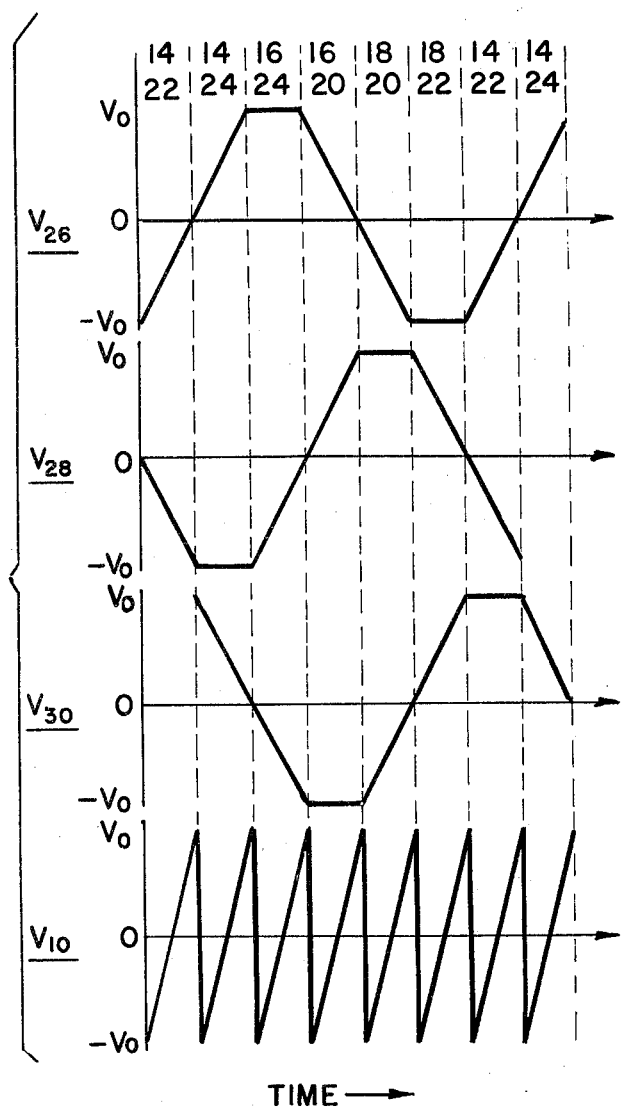
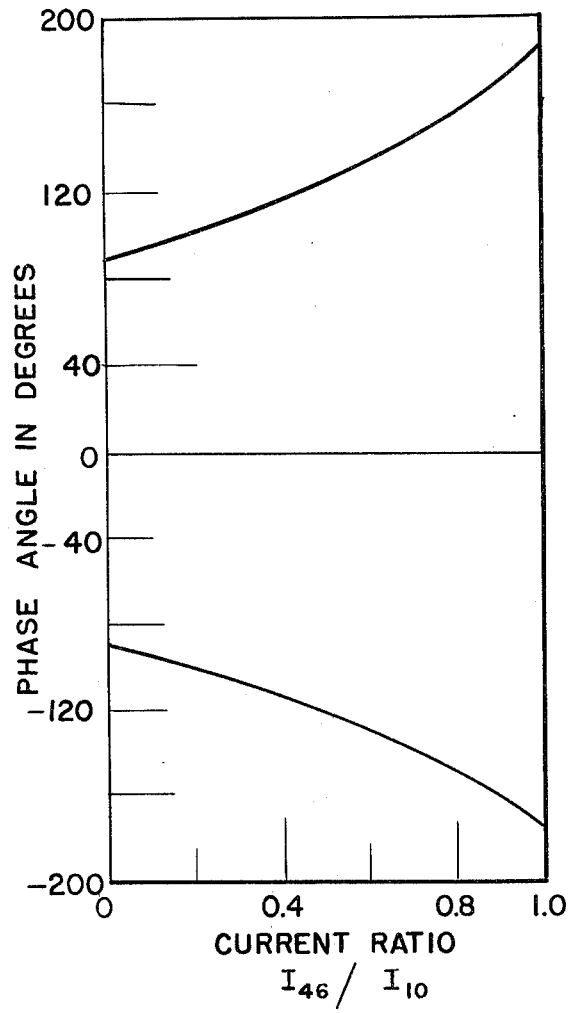

METHOD OF CONTROLLING SWITCHING OF A MULTIPHASE INDUCTOR-CONVERTER BRIDGE

BACKGROUND OF THE INVENTION

This invention relates to the control of energy transfer between a storage inductor and a load inductor through the use of a polyphase bridge.

A number of applications require the transfer of relatively large amounts of electrical energy into a coil. These applications include coils for the principal magnetic fields in synchrotron and other circulating particle accelerators and they include coils such as the ohmic heating coil and various confinement coils in proposed Tokamak power reactors. For applications such as these that require substantial amounts of power to be delivered to the coil, it is desirable to transfer the energy between a storage unit and the coil with little energy loss in the process rather than transfer the energy into and out of the utility grid when the associated magnetic field of the coil is reduced or increased. One way that has been proposed to do this is to use inductor-converter units that include a storage inductor connected to a polyphase bridge rectifier. The bridge rectifier is connected to an array of commutating capacitors and then to a second polyphase bridge rectifier which is connected to the load inductor or coil. Examples of the type of circuit described are given in a paper entitled "Superconductive Inductor-Convertor Units for Pulsed Power Loads" by Peterson, Mohan, Young, and Boom, published in the proceedings of the Conference on Energy Storage, Compression and Switching, November 5-7, 1974, Plenum Press, N.Y. 1976. Similar circuits are shown in Peterson and Mohan, U.S. Pat. No. 4,053,820, entitled "Active Filter". The paper and the patent deal first with the situation in which an ac power system is connected through a bridge to a storage inductor, especially a superconducting storage inductor which can in principle store large amounts of energy. Control of such a system is relatively straightforward because the ac system dominates the conduction through elements of a thyristor bridge by the fact that voltages are applied as supplied by the system. The references go on to indicate a circuit of the type that is controlled by the method and means of the present invention. However, where there is no dominant source such as a power system to control applied voltages, then the switching of thyristors in bridges to transfer energy from one inductor to another presents two problems. One is that of maintaining balance in the thyristor elements by controlling switching during relative and arbitrary changes. A second is to use the commutating capacitors optimally by charging them fully without overcharging.

It is an object of the present invention to provide an improved method of controlling the operations of an inductor-convertor unit. Other objects will become apparent in the course of a detailed description of the invention.

SUMMARY OF THE INVENTION

The operation of an inductor-converter unit for transferring electrical energy between a storage inductor and a load inductor is improved by a method of controlling the switching of the thyristors in the polyphase bridges of the circuit. Sensors of current in the source inductor and the load inductor provide a measure of current through, voltage across, and energy stored in the source and load inductors. Additional information about the voltage across each of the commutating capacitors enables determination of optimum switching sequences for the transfer of energy from one inductor to the other. A change in the direction or amount of energy flow is effected by introducing a phase change into the triggering sequence of one set of bridge thyristors. The change is introduced in two equal steps separated in time by an amount equal to an angular difference of 180°. A circuit is shown to implement the method of controlling the switching sequence in response to the detected currents and voltages.

BRIEF DESCRIPTION OF THE DRAWINGS

FIG. 2 is a set of time plots of wave forms of voltage in FIG. 1.

FIG. 5 is a plot of allowable phase angles as a function of current ratio.

DESCRIPTION OF THE PREFERRED EMBODIMENT

Figure 1:
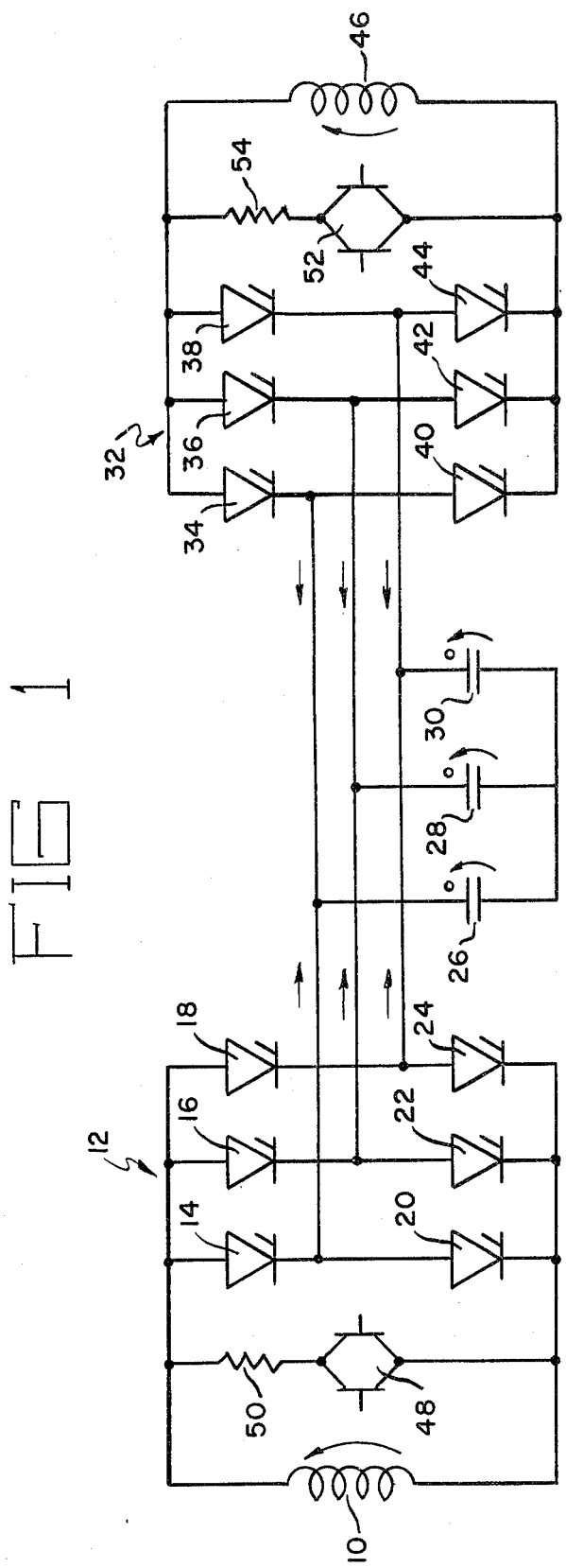
FIG. 1 is a block diagram of an inductor-convertor bridge circuit.

FIG. 1 is a circuit diagram of an inductor-convertor for the practice of the present invention. In FIG. 1 a storage inductor 10 is connected to a thyristor bridge 12. Bridge 12 is here shown as a three-phase full-wave bridge but the number of phases may be chosen to be any number equal to or greater than three. In FIG. 1 bridge 12 is formed of an appropriate interconnection of thyristors 14, 16, 18, 20, 22 and 24. Bridge 12 is connected in turn to capacitors 26, 28 and 30 which are themselves connected in a wye that is connected to bridge 32. Bridge 32 includes thyristors 34, 36, 38, 40, 42 and 44 in a full-wave bridge arrangement. Load inductor 46 is connected across bridge 32. The elements just described comprise an inductor-converter of the type that is well known. It should be evident from inspection that the definition of storage inductor 10 and load inductor 46 is a matter of choice since the circuit is symmetric. That symmetry will be useful in that energy will be transferable in either direction. It is clear that if energy is being transferred from load inductor 46 into storage inductor 10 then for that purpose load inductor 46 is a source and storage inductor 10 is a load.

FIG. 1 shows two refinements and omits others that are evident to one skilled in the art. Two transistors 48 are connected in series with resistor 50 and placed across storage inductor 10. Similarly, two transistors 52 are connected in series with the resistor 54 and placed across load inductor 46. The base leads of the transistors 48 and 52 are taken to a control circuit to switch the transistors 48 or 52 into conduction whenever the current through the appropriate storage inductor 10 or load inductor 46 drops to the order of the holding current of the thyristors 14-24 or 34-44. The appropriate transistors 48 or 52 are then switched into conduction to make sure that there is enough current flow in the appropriate circuit to permit its bridge to switch. This places the resistor 50 or 54 across the appropriate inductor 10 or 46. If the current in storage inductor 10 or load inductor 46 is increased beyond the minimal value then transistors 48 or 52 are switched out of conduction. Certain items are not shown in FIG. 1 for purposes of clarity. These are sensors of the current through storage inductor 10 and load inductor 46, the voltages across capacitors 26, 28 and 30, and the control connections to the thyristors and transistors. FIG. 1 is also shown without a means for making up energy losses of the type that will occur in any real circuit. Such losses would be made up by a connection of some sort of power converter in parallel with storage inductor 10 or an equivalent location that is obvious to one skilled in the art.

Before proceeding to the description of the operation of circuit 1, it is appropriate to note the importance of the functions of transistors 48 and 52 with resistors 50 and 54. One characteristic of thyristors such as thyristors 14 through 24 and 34 through 44 is that there is a minimum value of current for which the thyristors will stay in conduction. If one attempts to reduce the current below this value conduction ceases and thyristors become open circuits. This fact would either lead to dangerously high voltages or would make it impossible altogether to begin conduction in load inductor 46. Any change in conditions of energy storage normally takes many cycles, of the order of hundreds or thousands, to complete, and the amount of energy transferred in one cycle will normally represent a change in current in the load inductor that is less than the holding current of a thyristor. Thus, when inductor current is zero, it would be impossible to change the current from zero without a bypass. Similarly, when current in the inductor is decreasing and approaches the holding level, the absence of a bypass would lead to discontinuities and correspondingly large Ldi/dt voltages that might damage the equipment. Transistor 52 and resistor 54 provide a bypass around load inductor 46 to permit the flow of current through thyristors 34-44 to jump with substantial abruptness to a value greater than the holding level. When appropriate ones of the thyristors are carrying a current that is greater than the holding level it is then possible to gate the transistors 52 to switch off and ensure that the current flows through load inductor 46. A comparable function is performed for storage inductor 10 by transistors 48 and resistor 50 if the current in storage inductor 10 approaches or goes below the holding level. Because that level is a small fraction of the current-carrying capacity of a thyristor such as thyristor 14, transistors 48 and 52 may be relatively small in comparison with the power thyristors in the circuit. This means, however, that if it is desired for some reason to crowbar storage inductor 10 or load inductor 46 to hold a constant value of current at a relatively high level, transistors 48 and 52 will probably not have adequate current-carrying capacity. Such a crowbar will normally be connected separately and could also be applied by triggering a series pair of thyristors such as, for example, thyristors 14 and 20 for storage inductor 10 or thyristors 34 and 40 for load inductor 46.

The operation of the circuit of FIG. 1 will now be described with the aid of selected wave forms of voltage. FIG. 2 is a time plot of a set of wave forms for the condition when load current is zero in load inductor 46 and a non-zero value of current is flowing in storage inductor 10. FIG. 2 shows respectively the voltages across capacitor 26, capacitor 28, capacitor 30 and storage inductor 10, each plotted as a function of time and each taken with respect to the voltage reference arrows indicated for the particular components in FIG. 1. The four voltage wave forms are plotted to the same time scale and the time is marked with numbers 14, 16, 18, 20, 22 or 24 to indicate the thyristors that are switched into conduction during each time interval. It is supposed that a steady state has been achieved so that at time t=0 capacitor 26 is charged to a negative peak voltage equal in magnitude to $V_o$, capacitor 28 is uncharged and capacitor 30 is charged to a positive peak value of $V_o$. At time 0 thyristors 14 and 22 are in conduction. A positive value of current is taken to be flowing upward through storage inductor 10 and this value will be constant throughout all of the time shown in FIG. 2. During the first interval, the current from storage inductor 10 flows through thyristor 14 into capacitor 26, into capacitor 28 and through thyristor 22 to the other side of storage inductor 10. This direction of flow will charge capacitor 26 positively with respect to the reference arrow and will charge capacitor 28 negatively with respect to the reference arrow. The rate of change is linear because the current is constant and the charging rate is inversely proportional to the capacitance of capacitors 26, 28 and 30 which are here taken to be equal. Charging continues until capacitor 28 is charged negatively to a magnitude of $V_o$. At this time thyristor 22 is switched off and thyristor 24 is switched on while thyristor 14 is permitted to continue in conduction. Current that flows through storage inductor 10 now flows through thyristor 14, into capacitor 26, into capacitor 30, and through thyristor 24 to return to storage inductor 10. This continues the charging of capacitor 26, permits capacitor 28 to sit with an unchanging voltage, and discharges capacitor 30 at a linear rate. The voltage across inductor 10 is obtained by adding the voltages across the capacitors that are connected by thyristors to storage inductor 10 and neglecting here any voltage drop across the conducting thyristors. Thus, during the first interval the voltage across storage inductor 10 is given by $V_{26}-V_{28}$. During the second interval that voltage is given by $V_{26}-V_{30}$. The voltage across storage inductor 10 is thus a saw tooth as indicated in FIG. 2. That voltage is also proportional to the time derivative of the current in storage inductor 10 which under the operating condition of a bridge such as that in FIG. 1 will represent a small ac ripple voltage on top of a large dc component. The fact that the ripple is small has already been taken into account in assuming the linear variation of the various capacitor voltages as a function of time.

Several things appear from examination of the wave forms in FIG. 2. The first is that although the stored energy in storage inductor 10 is essentially constant, the slight variations associated with the ac ripple are important to the operation of the circuit. The variations represent an interchange of energy between storage inductor 10 and capacitors 26, 28 and 30 back to storage inductor 10. The energy that is transferred represents a small portion of the energy stored in storage inductor 10. The energy interchange is controlled by the switching of thyristors 14–24 in a sequence to produce the wave forms of FIG. 2. Because thyristors 34–44 are not switched there is no energy interchange with the elements on the right hand side of FIG. 1. It is also worth noting that an inspection of FIG. 1 and the associated wave forms FIG. 2 shows that capacitors 26, 28 and 30 are referred to appropriately as commutating capacitors. This results from the fact that the triggering of the next sequential thyristor at the appropriate time causes the application of a negative voltage across the thyristor that is going out of conduction. For example, referring to FIG. 2, it can be seen that in the first time interval thyristors 14 and 22 are conducting and that in the second time interval thyristor 22 has been switched off and thyristor 24 has been switched on. When thyristor 24 is triggered the voltage across thyristor 22 is $V_{30} - V_{28}$. This is essentially zero at the time of triggering but begins to build in the negative direction as thyristors 14 and 24 conduct. This tendency to build in the negative direction will cut off thyristor 22. It is apparent therefore that the capacitors 26, 28 and 30 have dual functions. They commutate the flow of current in switching from one thyristor to another and they act as intermediate energy storage elements. In the case of the waveform shown in FIG. 2 where there is no transfer of energy from storage inductor 10 to load inductor 46, the energy transfer is from storage inductor 10 to various of the capacitors 26, 28 and 30 and then back.

The process of energy transfer from storage inductor 10 to load inductor 46 is now simple to describe in principle. Whereas the wave forms in FIG. 2 showed energy going from storage inductor 10 into the capacitors 26, 28 and 30 and being returned to storage inductor 10, energy transfer from storage inductor 10 to load inductor 46 required that some of the energy from capacitors 26, 28 and 30 be delivered instead to storage inductor 46. To do this various of the thyristors 34–44 are triggered at appropriate times to provide bridge conduction through bridge 32 with a phase difference between the conduction times of the thyristors in bridge 12 and those in bridge 32. When this process is initiated, it will be necessary as stated earlier to switch the appropriate one of the transistors 52 into conduction to permit the flow of a current at least equal to the holding current through the thyristors of bridge 32. The voltage drop across resistor 54 and transistors 52 will cause some of this current to be switched into storage inductor 46 and when the current in storage inductor 46 has built to a value greater than the holding currents, transistors 52 can be gated off. Thus transistors 52 bypass storage inductor 46 to permit the flow almost instantaneously of a current that is large enough to permit the beginning of conduction in one or more of the thyristors 34–44. When the transistors 52 are gated off as described they no longer have an effect on the circuit.

Figure 3:
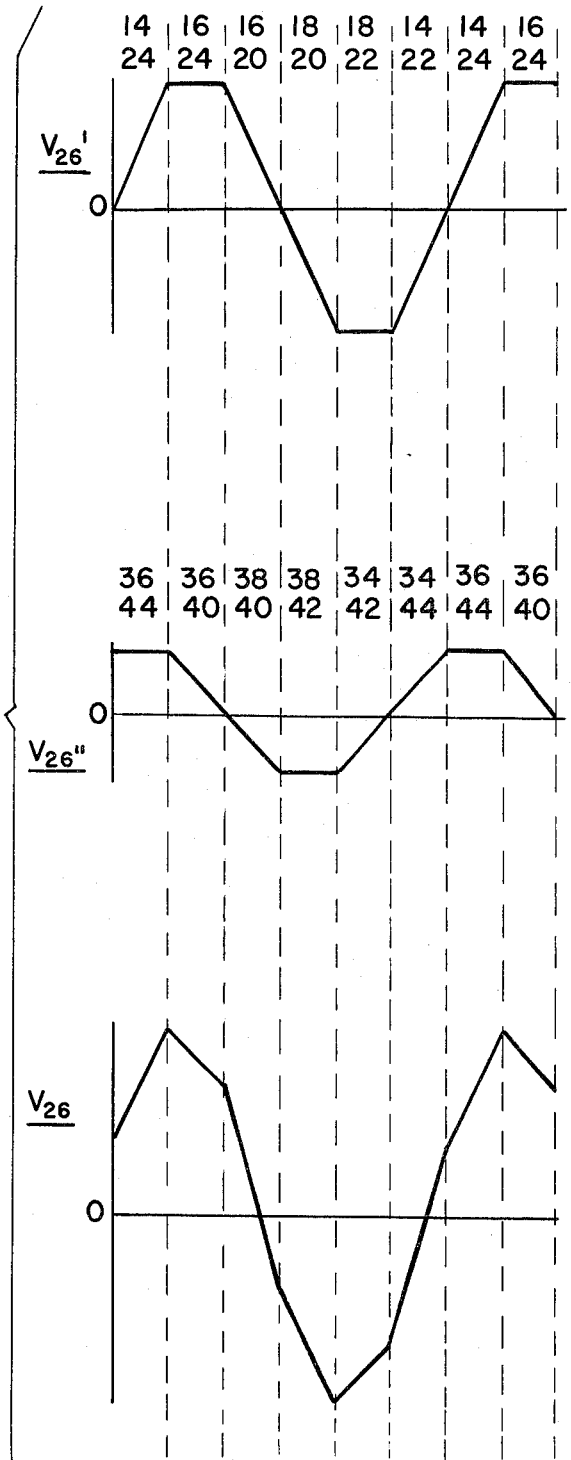
FIG. 3 is a set of time plots of components of capacitor voltage and their sum.
Figure 4:
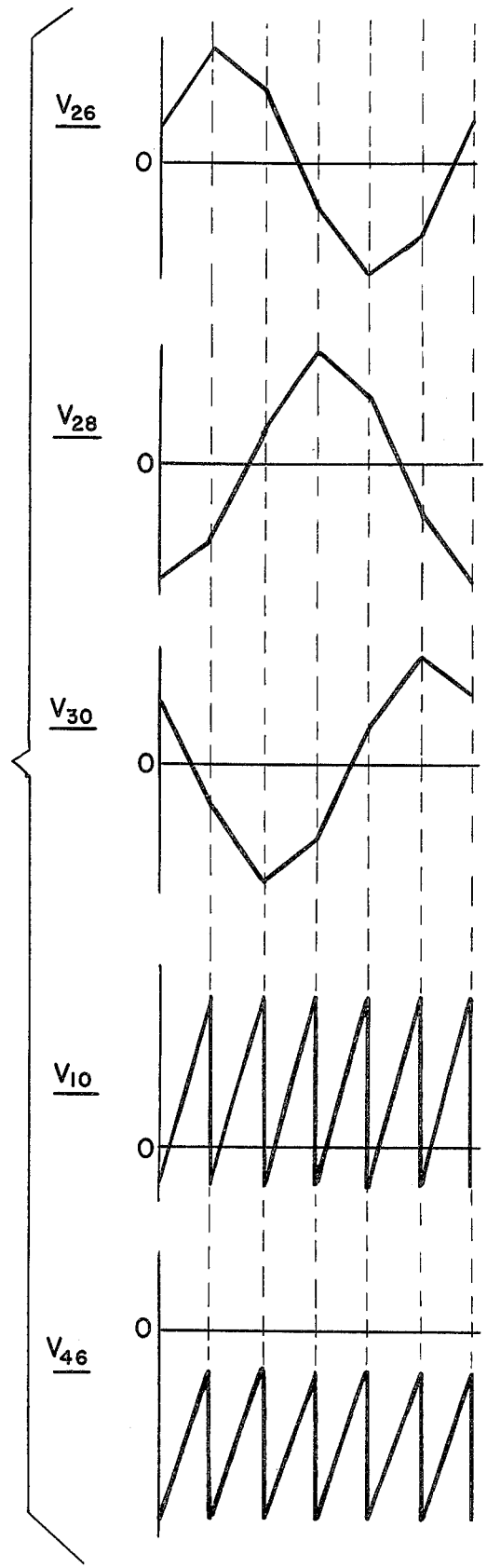
FIG. 4 is a set of time plots of capacitor and load voltages for the conditions of FIG. 3.

Regardless of the relative currents in the storage and load inductors, it is evident that the condition in which there is no energy interchange between the storage and load inductor is represented only by a situation in which the load thyristor attached to a given capacitor is triggered in phase with the source thyristor connected to the same capacitor. A different way of saying this is to say that whenever it is desired to change the division of energy between storage inductor 10 and load inductor 46, it will be necessary to generate a phase difference in the triggering sequence between thyristors 14–24 and thyristors 34–44. Since the condition of zero change in energy storage is represented by two triggering sequences that are in phase, the initiation of a change in energy levels requires a change in the triggering phases. Every such change to work must meet two tests. First, the change must not introduce imbalances in the circuit that will cause excessive voltages on the capacitors or across any components as a result of an attempt to interrupt a relatively large current flowing through an inductance. Second, the changes must be made so that any thyristors being triggered are commutated. This means that when a triggering signal is applied to the gate of a thyristor, the polarity of the thyristor must be such as to permit conduction through the thyristor and this conduction must in turn cause the application of a cutoff voltage to stop the conduction in another thyristor. Before examining the method of achieving these results, the results themselves are indicated in the waveforms of FIGS. 3 and 4. FIG. 3 is a set of time plots of the voltage across one capacitor and the components that contribute to that voltage. FIG. 4 is a set of time plots of the voltages across each of the three capacitors and those across the source and load inductors. Referring to FIG. 3, voltage $V'_{26}$ is the voltage across capacitor 26 resulting only from the current in storage inductor 10. The voltage $V''_{26}$ is a voltage across capacitor 26 resulting only from the current in load inductor 46. The third waveform marked $V_{26}$ is the sum of the two primed curves and is the total voltage across capacitor 26. Referring to the two primed curves, it can be seen that appropriate thyristors have been triggered as indicated by the numbers condition in each interval to cause the two waveforms to be 60° out of phase. Such triggering is associated with the transfer of energy from one inductor to the other. In this case, as will be seen, the transfer of energy is from storage inductor 10 to load inductor 46. This is made more evident from an inspection of FIG. 4 which is a set of time plots to the same time scale of voltages across the three capacitors 26, 28 and 30 and the voltages across storage inductor 10 and load inductor 46. It is not evident from an inspection of individual capacitor voltage waveforms whether energy transfer is from source to load but inspection of the inductor voltage curves $V_{10}$ and $V_{46}$ shows that the sawtooth of voltage across inductor 10 has a positive average value while the sawtooth across load inductor 46 has a negative average value. With the references as indicated in FIG. 1, this shows that storage inductor 10 is delivering net energy and load inductor 46 is receiving energy.

A curve summarizing the limits over which energy transfer can be accomplished in the case of a three phase bridge connected between a load inductor and a storage inductor having equal inductance is shown in FIG. 5. FIG. 5 is a plot of the phase angle of the load switching sequence relative to the storage switching sequence as a function of the ratio of load current to storage current over a range of ratios from 0 to 1. The dividing line between upper and lower portions of the plot is zero degrees representing no interchange between storage inductor and load inductor. In the upper half of the curve up to the upper line energy flows from the storage inductor to the load inductor. Below the zero line energy returns from the load inductor to the storage inductor. Outside the limit curves the circuit will not operate because some of the thyristors will not be biased properly to commutate.

Figure 6:
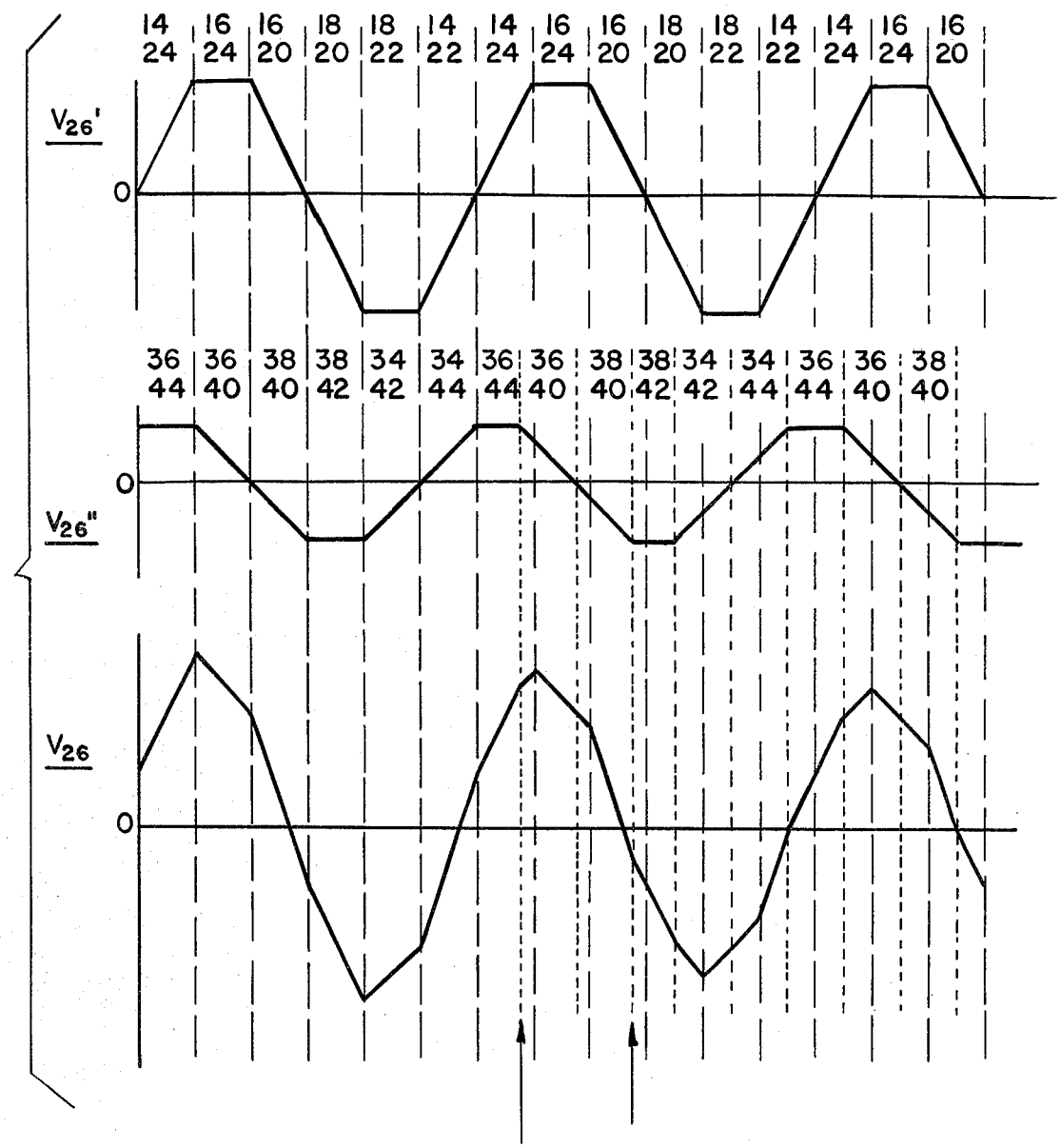
FIG. 6 is a set of time plots of voltages on capacitor 26 showing a step change.
Figure 7:
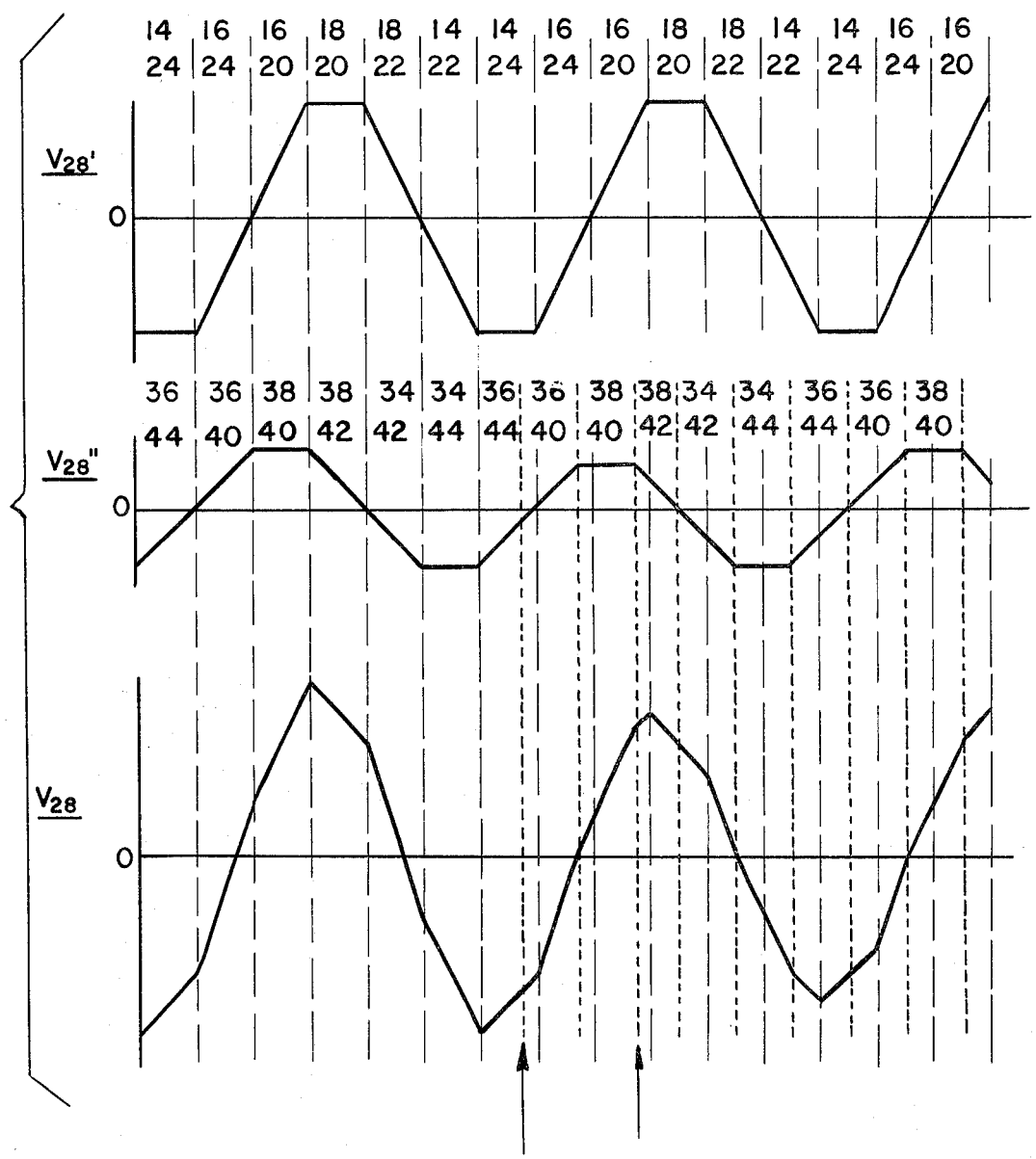
FIG. 7 is a set of time plots of voltages on capacitor 28 showing a step change.
Figure 8:
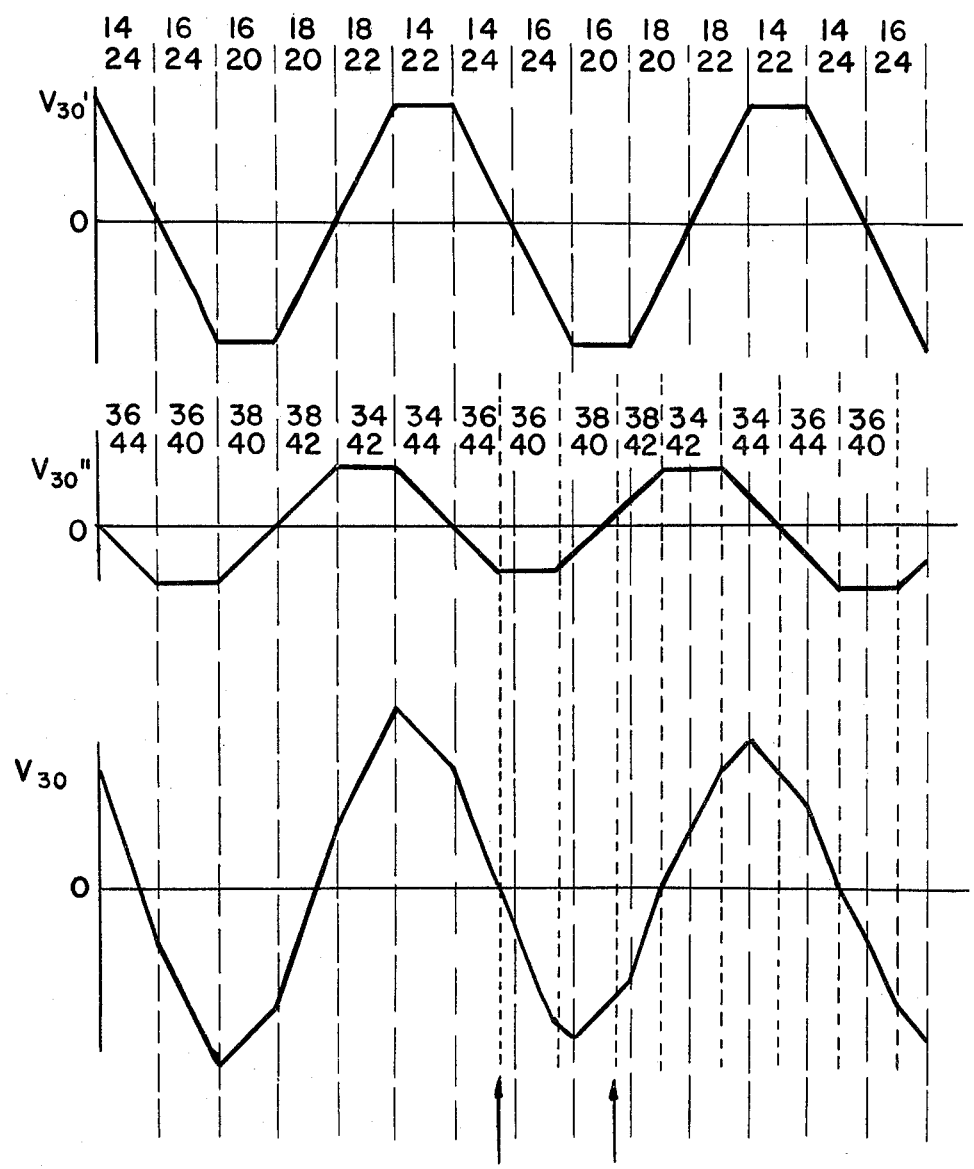
FIG. 8 is a set of time plots of voltages on capacitor 30 showing a step change.
Figure 9:
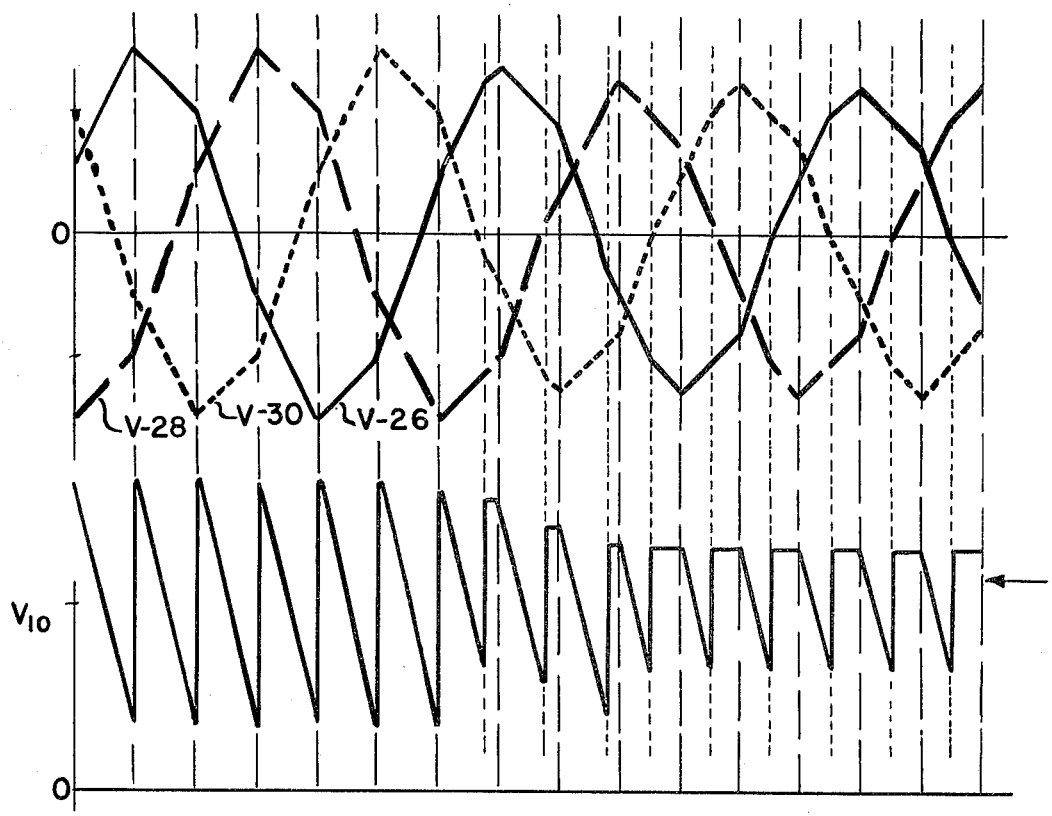
FIG. 9 is a set of time plots of voltages on the capacitors and the load voltage showing a step change.

The waveforms in FIGS. 2–4 and the summary characteristic in FIG. 5 have illustrated two types of conditions that might be described as steady state. The first condition in FIG. 2 was one in which there was no interchange of energy between storage and load inductor. The second condition of FIGS. 3 and 4 showed a steady interchange of energy from storage inductor 10 to load inductor 46. It is possible to find a range of operating points as defined in FIG. 5 that will permit the delivery of energy from one inductor to the other at a desired rate as shown. The present invention is a method of changing from delivery at one rate to delivery at another rate without creating imbalances in the circuit or dangerous over-voltages. Another way of describing this is to say that the present invention is a method of changing the phase angle of triggering between load thyristors and source thyristors without either losing commutation or generating imbalances. A typical such change is shown in FIGS. 6, 7 and 8 which are sets of waveforms of components of capacitor voltages and the total capacitor voltages for changing the timing to switch the phase angle between source thyristors and load thyristors from $+60°$, representing one rate of energy transfer from storage inductor 10 to load inductor 46, to $+90°$, representing a different rate of energy transfer from storage inductor 10 to load inductor 46. The changes are made by matched advances of $15°$ in timing, made at the times indicated by vertical arrows in FIGS. 6, 7 and 8. The phase changes of the separate components are evident by inspection of the waveforms $V''_{26}$, $V''_{28}$, and $V''_{30}$. As compared with the corresponding single-primed voltages, it can be seen that the phase is shifted by the deletions at the arrows. The symmetry of these deletions and their timing also preserves commutation and prevents the development of imbalance voltages across either of the inductors. Corresponding inductor voltages are shown in FIG. 9 and it can be seen in FIG. 9 that the shifts in timing of thyristor firing have changed the average values of inductor voltage to reflect the different directions of energy flow. In terms of the waveform of capacitor voltages, the desired phase change has been introduced in one set of thyristors in two increments each equal to one-half the desired change and located 180° apart in the waveform. It should be evident that in the curves of FIGS. 6–9 the source thyristors have been kept at a constant frequency and the triggering of the load thyristors has been changed to introduce a phase difference. This choice is that made to increase the rate of energy delivery to the load, or reduce that to the source. It would be equally as easy to keep the load thyristors operating at a fixed frequency and introduce the symmetrical advances in the triggering pattern of the source thyristors. This would increase the rate energy is delivered to the source or reduce that to the load. In either case the result is to transfer some of the energy that has been supplied to the capacitor away from one of the inductors and deliver it to the other inductor. It should be emphasized that an appropriate selection of inductors and capacitors will normally be such that it will take hundreds or even thousands of cycles to go from a condition where one inductor is carrying a maximum current and the other is carrying zero current to a condition of equal energy storage in the two inductors. The number of necessary steps is a function of the phase angles between the triggering of source and load thyristors and is also a function of the maximum desired voltages to be applied to the capacitors. Typically the maximum energy that each of the capacitors will be able to store without exceeding its allowable voltage rating is of the order of hundredths or thousandths of the maximum stored energy of each of the inductors. For applications such as the ohmic heating coils of a large Tokamak or the magnets of a synchrotron, the maximum stored energy in the load inductor may be of the order of gigajoules. Typical currents in the storage and load inductors are of the order of tens of thousands of amperes. To effect control of the energy transfer, it is necessary to obtain signals proportional to the voltages across and the current through storage inductor 10 and load inductor 46 and the voltages across capacitors 26, 28 and 30.

Figure 10:
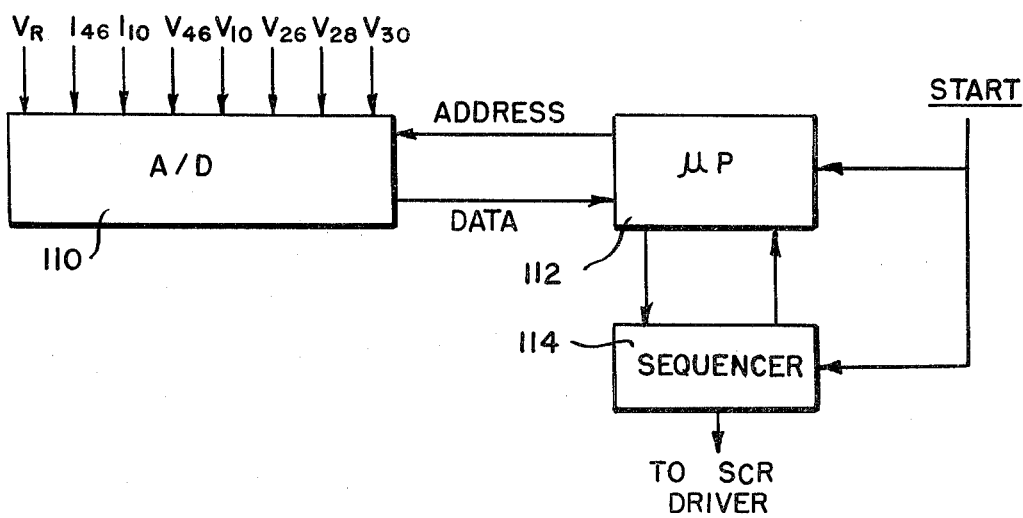
FIG. 10 is a block diagram of a control for operating the inductor-convertor bridge current of FIG. 1.
Figure 11:
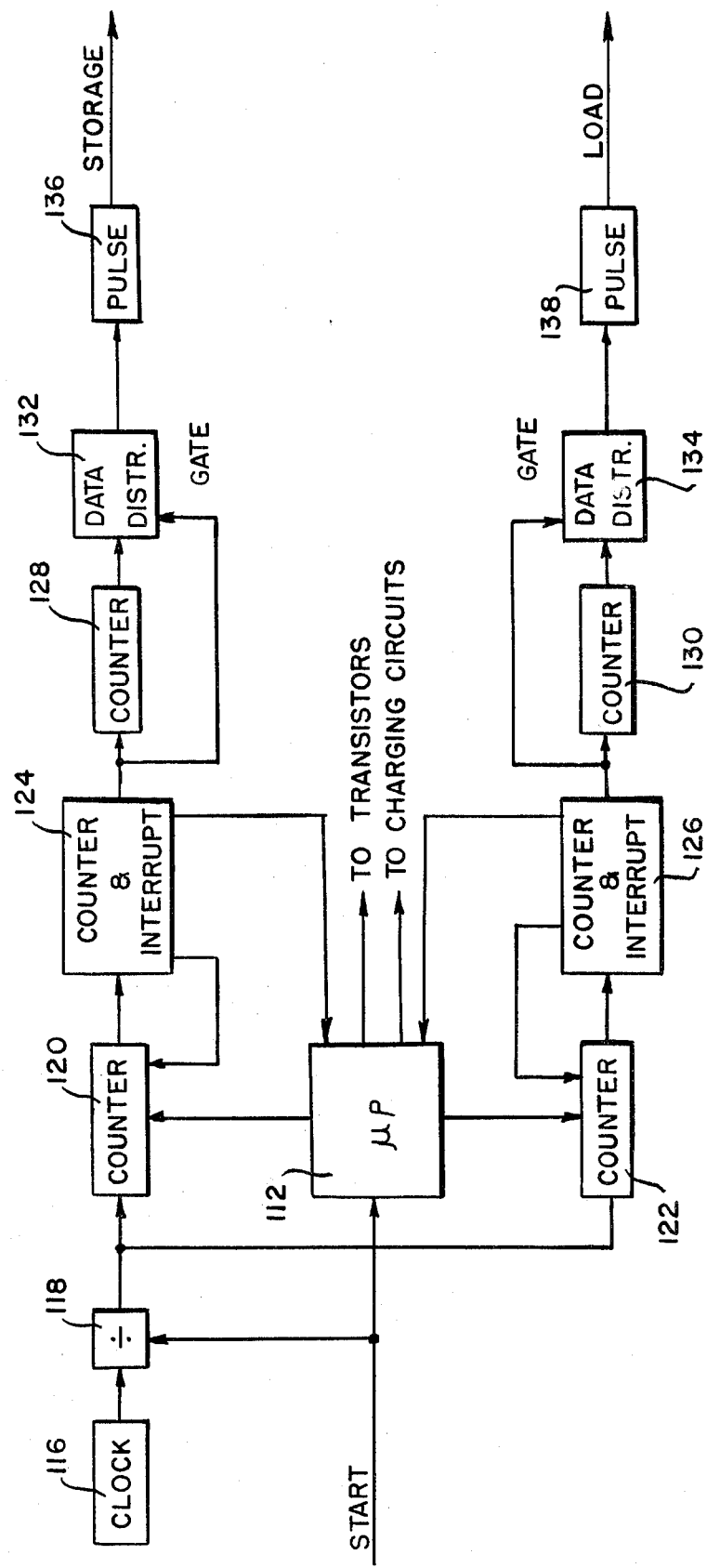
FIG. 11 is a block diagram of the sequencer of FIG. 10.

FIG. 10 is a block diagram of a controller that has been built to practice the invention at the Argonne National Laboratory, and FIG. 11 is an expanded block diagram of the sequence of FIG. 10. In FIG. 10 analog-to-digital (A/D) converter 110 receives signals corresponding to voltages $V_{10}$, $V_{46}$, $V_{26}$, $V_{28}$ and $V_{30}$ and currents $I_{10}$ and $I_{46}$ of FIG. 1. In addition, A/D 110 receives a reference voltage $V_R$ for situations when it is desired to follow an external signal such as a ramp for an accelerator magnet or a feedback voltage from sums in a Tokamak. Digital signals are connected to a microprocessor 112 which is programmed to control a pulse sequencer 114. Control signals from microprocessor 112 times the firing of the thyristors of FIG. 1 through pulse sequencer 114, and also operate the transistors 48 and 52 of FIG. 1. A signal line is also indicated from microprocessor 112 in FIG. 11 to a charging circuit to control the supply of energy to storage inductor 10 from an external source.

The sequencer of FIG. 11 is timed from a clock 116, the output of which is divided in divider 118 and fed to counters 120 and 122, one in the source side and one in the load side. Load counters 124 and 126 include logic to count pulses for switching cycles. A pair of mod 6 counters 128 and 130 count complete cycles of the thyristor bridges to initiate repetitive action, and supply pulses to data distributors 132 and 134 that are gated to trigger pulse generators 136 and 138 that trigger chosen thyristors.

The embodiments of the invention in which an exclusive property or privilege is claimed are defined as follows:

1. A method of obtaining a desired change in the rate of energy transfer in an inductor-converter circuit in which a storage inductor is connected to a storage thyristor bridge, thence through commutating capacitors to a load thyristor bridge, thence to a load inductor, the method comprising:
   determining a desired change in phase angle corresponding to the desired change in the rate of energy transfer;
   changing phase of one of the thyristor bridges by one-half the desired change in phase angle at an arbitrary time; and
   changing phase of the one of the thyristor bridges by one-half the desired change in phase angle at an angle that is one-half cycle later in time than the arbitrary time.

2. The method of claim 1 wherein the steps of changing phase comprise in addition:
   advancing the phase of the load thyristor bridge when energy is being transferred to the load inductor,
   whereby the rate of energy transfer to the load is increased.

3. The method of claim 1 wherein the steps of changing phase comprise in addition:

advancing the phase of the load thyristor bridge when energy is being transferred to the storage inductor, whereby the rate of energy transfer to the storage inductor is decreased.

4. The method of claim 1 wherein the steps of changing phase comprise in addition:

advancing the phase of the storage thyristor bridge when energy is being transferred to the storage induction, whereby the rate of energy transfer to the storage inductor is increased.

5. The method of claim 1 wherein the steps of changing phase comprise in addition:

advancing the phase of the storage thyristor bridge when energy is being transferred to the load inductor, whereby the rate of energy transfer to the load inductor is decreased.

6. The method of claim 1 wherein the steps of changing phase comprise in addition:

retarding the phase of the storage thyristor bridge, whereby the rate of energy transfer is increased in the direction of the load inductor.

7. The method of claim 1 wherein the steps of changing phase comprise in addition:

retarding the phase of the load thyristor bridge, whereby the rate of energy transfer is increased in the direction of the storage inductor.

* * * * *